United States Patent
Tamamoto et al.

(10) Patent No.: US 12,103,101 B2
(45) Date of Patent: Oct. 1, 2024

(54) VIBRATION CONVERSION APPARATUS WITH FLEXURAL RESONATOR PORTIONS

(71) Applicant: BRANSON ULTRASONICS CORPORATION, Brookfield, CT (US)

(72) Inventors: Osamu Tamamoto, Atsugi (JP); Lang Wang, Atsugi (JP)

(73) Assignee: Branson Ultrasonics Corporation, Brookfield, CT (US)

( * ) Notice: Subject to any disclaimer, the term of this patent is extended or adjusted under 35 U.S.C. 154(b) by 411 days.

(21) Appl. No.: 17/416,280

(22) PCT Filed: Dec. 19, 2019

(86) PCT No.: PCT/US2019/067638
§ 371 (c)(1),
(2) Date: Jun. 18, 2021

(87) PCT Pub. No.: WO2020/132344
PCT Pub. Date: Jun. 25, 2020

(65) Prior Publication Data
US 2022/0072650 A1 Mar. 10, 2022

(30) Foreign Application Priority Data

Dec. 19, 2018 (JP) .................. 2018-236996

(51) Int. Cl.
*B23K 20/10* (2006.01)
*B06B 3/00* (2006.01)
*B29C 65/08* (2006.01)

(52) U.S. Cl.
CPC ............... *B23K 20/10* (2013.01); *B06B 3/00* (2013.01); *B29C 65/081* (2013.01); *B06B 2201/72* (2013.01)

(58) Field of Classification Search
CPC ....... B06B 2201/72; B06B 3/00; B23K 20/10; B29C 65/081
See application file for complete search history.

(56) References Cited

U.S. PATENT DOCUMENTS 3,039,333 A * 6/1962 Jones ................... B23K 20/106
228/1.1
3,184,841 A * 5/1965 Jones ..................... B23K 20/10
228/110.1

(Continued)

FOREIGN PATENT DOCUMENTS

CN 103920635 B 3/2016
DE 102012221489 A1 * 5/2014 ............. B23K 20/10

(Continued)

OTHER PUBLICATIONS

International Preliminary Report on Patentability and Written Opinion of the International Searching Authority regarding International Application No. PCT/US2019/067638, dated Jun. 16, 2021.

(Continued)

*Primary Examiner* — Erin B Saad
*Assistant Examiner* — Carlos J Gamino
(74) *Attorney, Agent, or Firm* — Harness, Dickey & Pierce, P.L.C.

(57) ABSTRACT

To provide a vibration conversion apparatus capable of reducing occurrence of cracks although using a longitudinal vibration converter for obtaining a torsional vibration. The vibration conversion apparatus comprises: a first longitudinal vibration converter and a longitudinal-torsional transducer having a one-wavelength torsional vibrator portion and a first flexural resonator portion. The first flexural resonator portion is interposed between the first longitudinal vibration converter and the one-wavelength torsional vibrator portion. The first flexural resonator portion is configured such that when a longitudinal vibration generated by at least (Continued)

the first longitudinal vibration converter is received from one end of the first flexural resonator portion, the first flexural resonator portion is bent and imparts a rotational force from the other end of the first flexural resonator portion to the one-wavelength torsional vibrator portion.

10 Claims, 9 Drawing Sheets

(56) References Cited

U.S. PATENT DOCUMENTS

| | | | | |
|---|---|---|---|---|
| 3,257,721 | A * | 6/1966 | Jones | B23K 20/106 228/1.1 |
| 3,319,984 | A * | 5/1967 | Jones | B23K 20/10 228/110.1 |
| 5,662,766 | A | 9/1997 | Ishikawa et al. | |
| 6,811,630 | B2 * | 11/2004 | Tominaga | B06B 3/00 156/580.2 |
| 8,657,182 | B2 * | 2/2014 | Buettiker | B23K 20/106 228/110.1 |
| 8,840,005 | B2 * | 9/2014 | Lang | B23K 20/10 156/580.2 |
| 2003/0168938 | A1 * | 9/2003 | Wallaschek | H01L 24/75 310/328 |
| 2006/0071054 | A1 * | 4/2006 | Bolser | B23K 20/10 228/124.6 |

FOREIGN PATENT DOCUMENTS

| | | |
|---|---|---|
| EP | 0962261 A1 | 12/1999 |
| GB | 1262534 A | 2/1972 |
| JP | H08206854 A | 8/1996 |
| JP | 2002282787 A | 10/2002 |
| WO | WO-2018-171864 A1 | 9/2018 |

OTHER PUBLICATIONS

Decision of Rejection regarding Chinese Patent Application No. 201980084756.X, dated Feb. 3, 2023. Translation provided by Unitalen Attorneys at Law.

International Search Report and Written Opinion of the International Searching Authority issued in PCT/US2019/067638, mailed Mar. 27, 2020; ISA/EP (9 pages).

First Office Action regarding Chinese Patent Application No. 201980084756.X, dated Apr. 13, 2022. Translation provided by Unitalen Attorneys at Law.

Second Office Action regarding Chinese Patent Application No. 201980084756.X, dated Sep. 20, 2022. Translation provided by Unitalen Attorneys at Law.

Office Action regarding Korean Patent Application No. 10-2021-7018946, dated Jul. 12, 2024. Translation provided by UNIS Patent and Law Firm.

* cited by examiner

VIBRATION CONVERSION APPARATUS WITH FLEXURAL RESONATOR PORTIONS

CROSS-REFERENCE TO RELATED APPLICATIONS

This application is a U.S. National Phase Application under 35 U.S.C. 371 of International Application No. PCT/US2019/067638, filed on Dec. 19, 2019, which claims priority to Japanese Patent Application No. 2018-236996, filed on Dec. 19, 2018. The entire disclosures of the above applications are expressly incorporated by reference herein.

TECHNICAL FIELD

The present invention relates to a vibration conversion apparatus that converts a longitudinal vibration to a torsional vibration.

BACKGROUND ART

Application techniques using strong ultrasonic waves are widely accepted in an industry such as welding, cleaning, and pulverizing. One of the techniques is ultrasonic welding technology. From the point of view of the welding device, the objects to be welded can be broadly classified into plastics and metals.

Further, from the point of view of the vibration mode, the vibration can be broadly classified into a longitudinal vibration, a transverse vibration, and a torsional vibration. As used herein, the longitudinal vibration is a designation that the pressurizing direction is the same as the vibration direction, and the transverse vibration is a designation that the pressurizing direction is orthogonal to the vibration direction. The same converter serving as the vibration source can be adopted for both the longitudinal vibration and the transverse vibration, and in general, the transverse vibration is applied to metal welding.

Meanwhile, the torsional vibration is a designation that the vibration direction follows an arc about a predetermined axis. The method of generating a torsional vibration is classified into a first mode in which a torsional vibration is generated directly by a torsional converter, and a second mode in which a torsional vibration is generated from a longitudinal vibration converter. However, the first mode using the torsional converter has a tendency that a high output power cannot be obtained. Meanwhile, as the second mode, there is a configuration disclosed in European Patent Application No. EP 0962261 A, Specification.

As described in the configuration disclosed in European Patent Application No. EP 0962261 A, Specification, when a longitudinal vibration is converted to a torsional vibration, linear motion needs to be mechanically coupled to arc vibration. Therefore, this configuration involves a problem that excessive concentrated stress is repeatedly generated at a portion connecting a longitudinal vibration converter and a torsional vibrator portion mutually connected by brazing or welding, resulting in that cracks are likely to occur in a member of the connected portion.

CITATION LIST

Patent Literature

[Patent Literature 1] European Patent Application No. EP 0962261 A, Specification

SUMMARY OF INVENTION

Technical Problem

In view of the above problem, the present invention has been made, and an object of the present invention is to provide a vibration conversion apparatus capable of reducing occurrence of cracks although using a longitudinal vibration converter for obtaining a torsional vibration.

Solution to Problem

A vibration conversion apparatus of the present invention for achieving the above object comprises: a first longitudinal vibration converter; and a longitudinal-torsional transducer having a one-wavelength torsional vibrator portion and a first flexural resonator portion, wherein the first flexural resonator portion is interposed between the first longitudinal vibration converter and the one-wavelength torsional vibrator portion, and the first flexural resonator portion is configured such that when a longitudinal vibration generated by at least the first longitudinal vibration converter is received from one end of the first flexural resonator portion, the first flexural resonator portion is bent and imparts a rotational force from the other end of the first flexural resonator portion to the one-wavelength torsional vibrator portion.

Advantageous Effects of Invention

The present invention can reduce the occurrence of cracks although using a longitudinal vibration converter for obtaining a torsional vibration.

DESCRIPTION OF EMBODIMENTS

Figure 1:
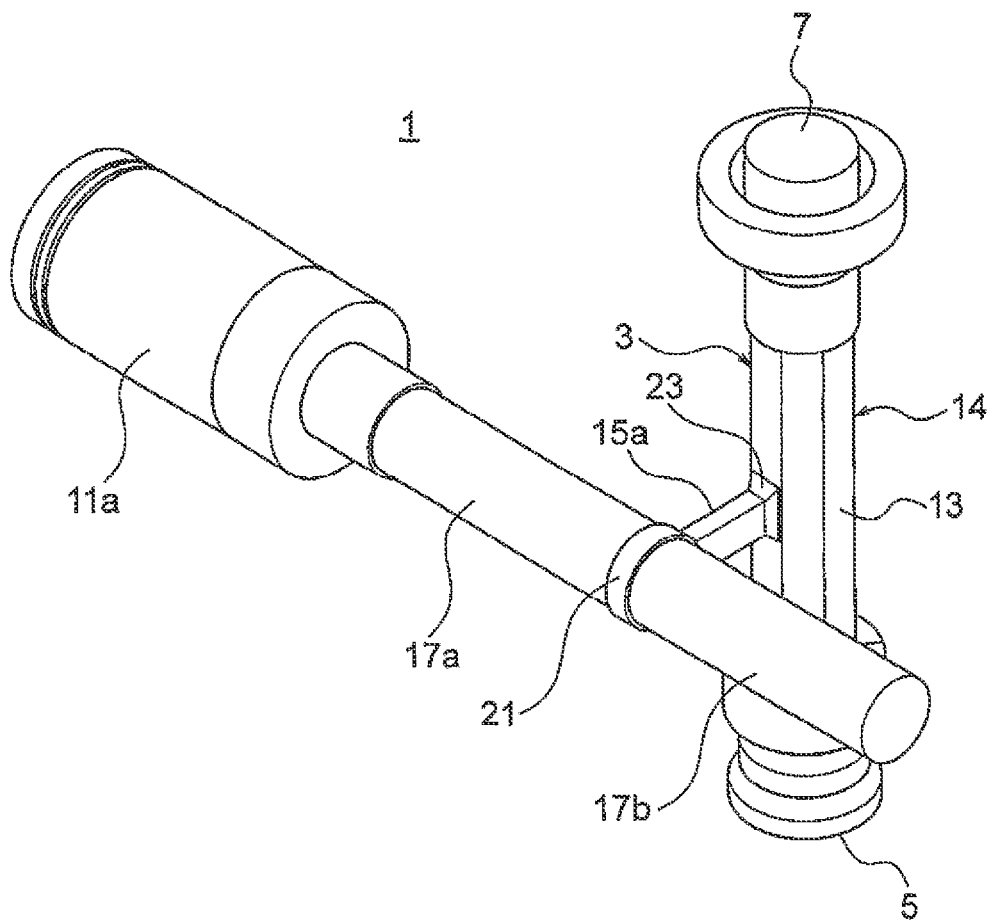
FIG. 1 is a perspective view illustrating an ultrasonic welding device according to a first embodiment of the present invention.
Figure 1:
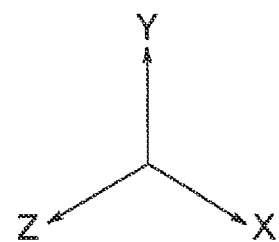

Hereinafter, embodiments in which the vibration conversion apparatus of the present invention is implemented as an ultrasonic welding device will be described with reference to the accompanying drawings. It should be noted that in the drawings, the same reference numerals or characters denote the same or corresponding portions.

First Embodiment

Figure 2:
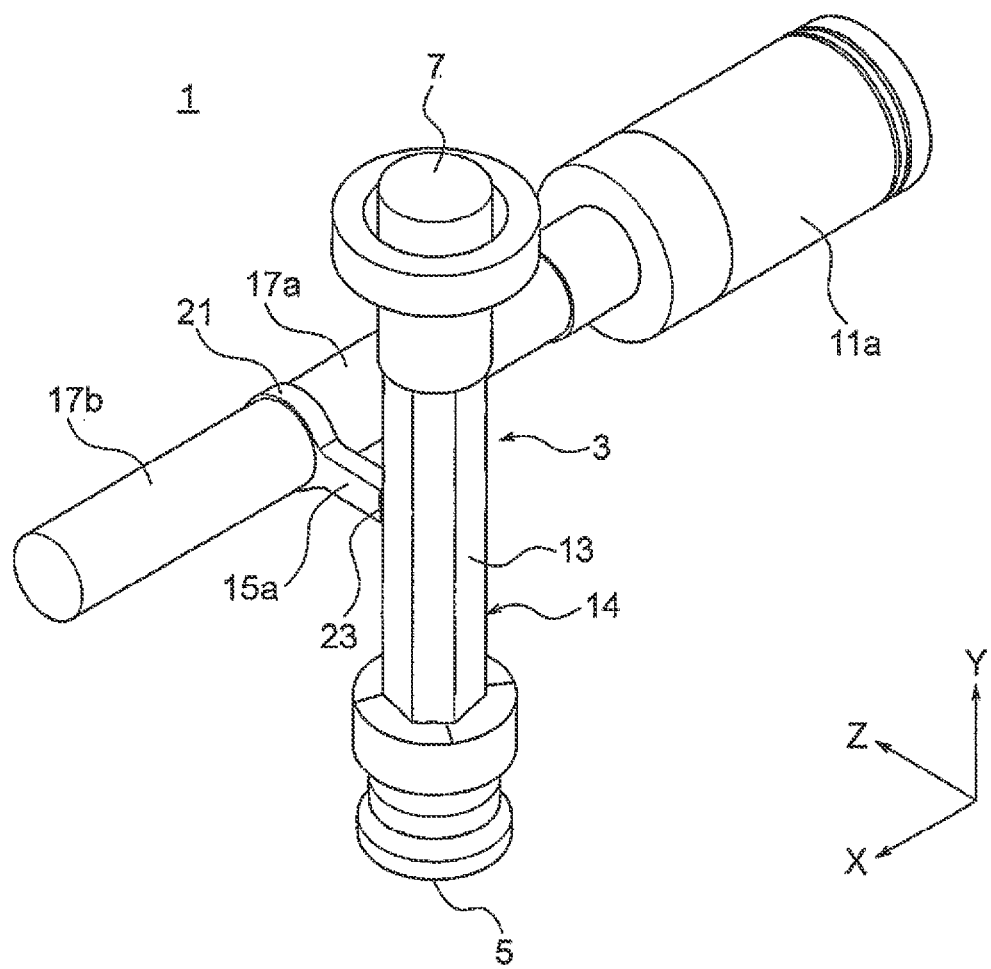
FIG. 2 is a perspective view illustrating the ultrasonic welding device of FIG. 1 as viewed from a direction different from that of FIG. 1.
Figure 3:
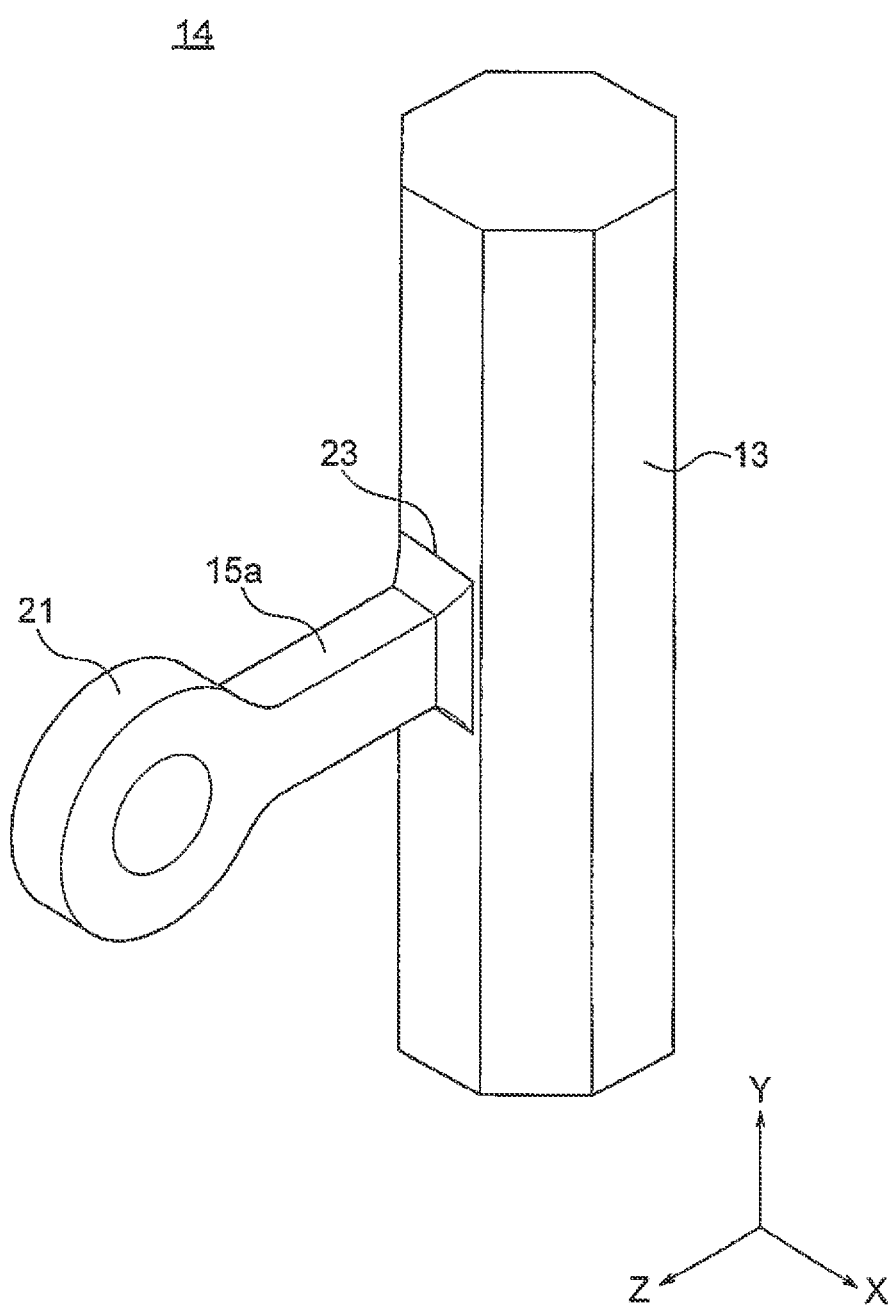
FIG. 3 is a perspective view illustrating an entire longitudinal-torsional transducer of the ultrasonic welding device according to the first embodiment.

FIG. 1 is a perspective view illustrating an outline of an ultrasonic welding device according to a first embodiment of the present invention. FIG. 2 is a perspective view illustrating the ultrasonic welding device of FIG. 1 as viewed from a direction different from that of FIG. 1. FIG. 3 is a perspective view illustrating an entire longitudinal-torsional transducer of the ultrasonic welding device according to the first embodiment. Note that the description uses three axes of XYZ orthogonal to each other, assuming that in the drawings, the X direction is the left-right direction, the Y direction is the height direction, and the Z direction is the front-back direction.

An ultrasonic welding device 1 comprises a vibration conversion apparatus 3, a working torsional horn 5, and a torsional support horn 7. Hereinafter, the detail of the vibration conversion apparatus 3 will be described.

As illustrated in FIGS. 1 and 2, the vibration conversion apparatus 3 comprises a first longitudinal vibration converter 11a; and a longitudinal-torsional transducer 14 having a one-wavelength torsional vibrator portion 13 and a first flexural resonator portion 15a. Although the present invention is not necessarily limited to this example, in the present embodiment, the vibration conversion apparatus 3 further comprises a first longitudinal vibration horn 17a and a second longitudinal vibration horn 17b. As the entire configuration is illustrated in FIG. 3, the longitudinal-torsional transducer 14 includes the one-wavelength torsional vibrator portion 13 and the first flexural resonator portion 15a. The one-wavelength torsional vibrator portion 13 and the first flexural resonator portion 15a are a one-piece component that can be manufactured by cutting out from an integral metal body as an example. Further, another example may include a molding method by pouring into a mold or a molding method by powder metallurgy.

The support horn 7 and the working torsional horn 5 are threadedly connected to an upper end and a lower end of the longitudinal-torsional transducer 14, respectively. A flange portion of the support horn 7 plays a role of supporting and pressurizing the entire vibration conversion apparatus including the longitudinal vibration converter. The one-wavelength torsional vibrator portion 13 is torsionally rotated so as to substantially prevent the rotating shaft from moving while being pressurized toward the object to be welded. The one-wavelength torsional vibrator portion 13 is a rod-shaped member (a columnar member), and as an example, in the present embodiment, is a prismatic member whose cross section perpendicular to the axial direction has a substantially regular octagonal outer shape, extending in the vertical direction. Note that any member having a circular cross section, a square section other than the octagonal cross section, a star-shaped cross section, or an asymmetrical cross section can be used, but a columnar member having an octagonal cross section is easily machined.

The first flexural resonator portion 15a is interposed between the first longitudinal vibration converter 11a and the one-wavelength torsional vibrator portion 13. The first longitudinal vibration horn 17a is located on a vibration transmission path between the first longitudinal vibration converter 11a and one end 21 of the first flexural resonator portion 15a. Further, the other end 23 of the first flexural resonator portion 15a is connected to the longitudinal-torsional transducer 13.

The vibration conversion apparatus 3 of the first embodiment further comprises the second longitudinal vibration horn 17b. The one end 21 of the first flexural resonator portion 15a is interposed between the first longitudinal vibration horn 17a and the second longitudinal vibration horn 17b in a longitudinal vibration direction (X direction).

Figure 4:
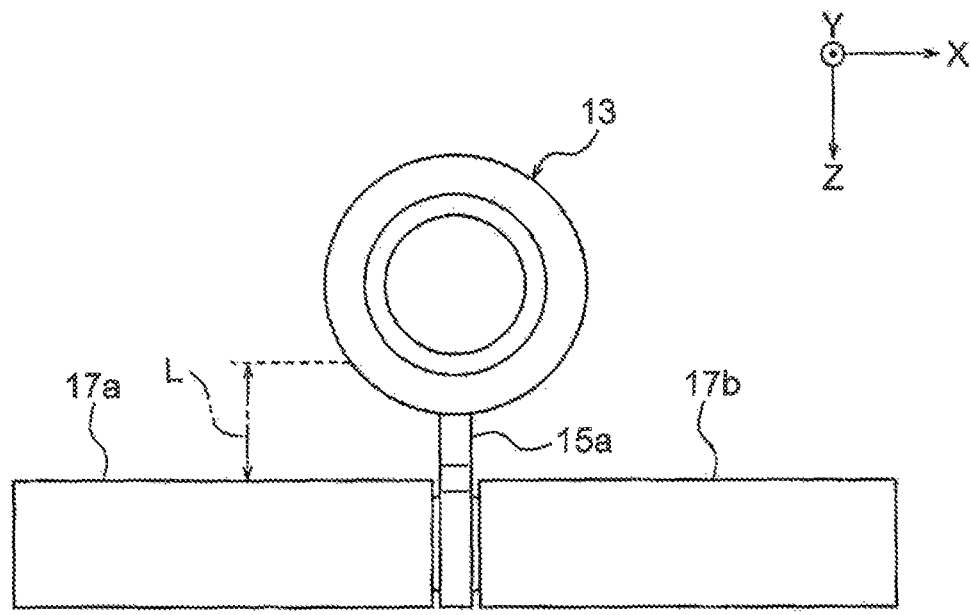
FIG. 4 is a view illustrating an operation of the vibration conversion apparatus of the present invention.
Figure 5:
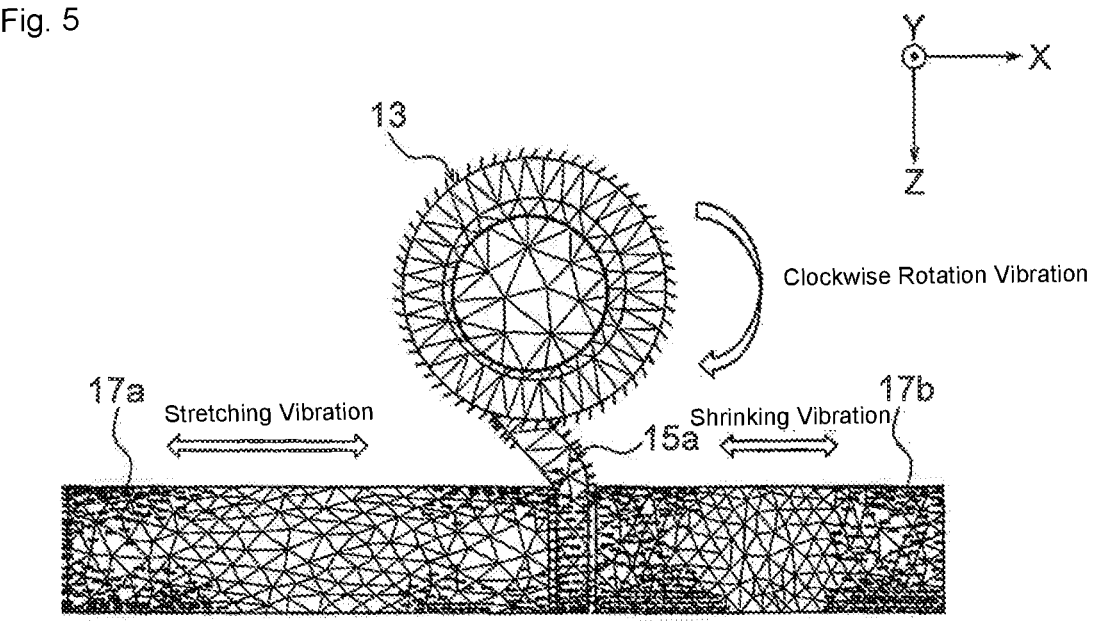
FIG. 5 is a view illustrating another operation of the vibration conversion apparatus of the present invention.
Figure 6:
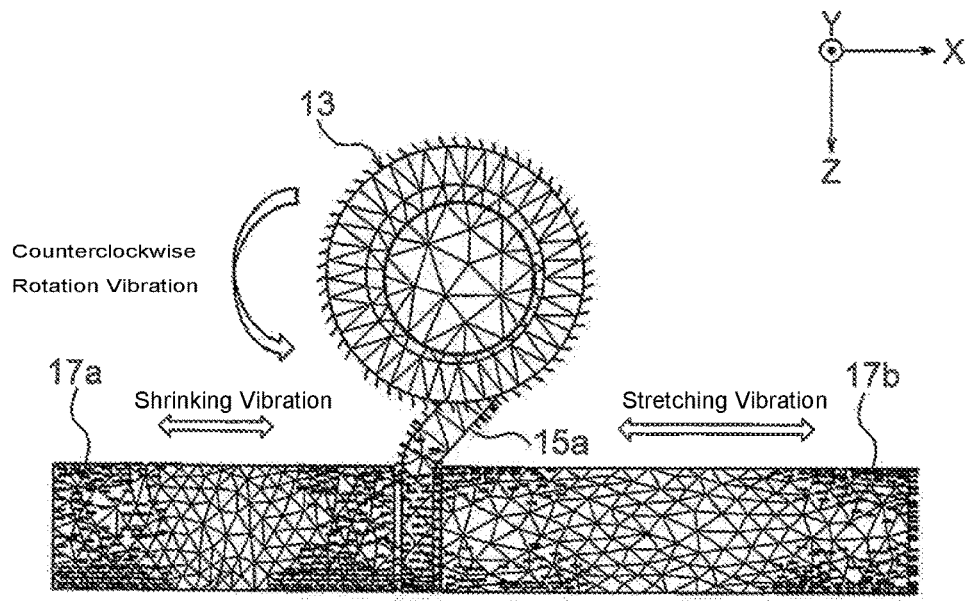
FIG. 6 is a view illustrating still another operation of the vibration conversion apparatus of the present invention.

Then, an operation of the ultrasonic welding device, namely, the vibration conversion apparatus of the thus configured first embodiment will be described with reference to FIGS. 4 to 6. FIG. 4 is a view illustrating an operation of the vibration conversion apparatus of the present invention. FIG. 5 is a view illustrating another operation of the vibration conversion apparatus. FIG. 6 is a view illustrating still another operation of the vibration conversion apparatus.

First, a longitudinal vibration generated by the first longitudinal vibration converter 11a is transmitted to the first longitudinal vibration horn 17a. This longitudinal vibration causes the state of FIG. 5 and the state of FIG. 6 to be alternately repeated. FIG. 5 illustrates the state in which when the first longitudinal vibration horn 17a causes a stretching vibration, the second longitudinal vibration horn 17b causes a shrinking vibration; and FIG. 6 illustrates the state in which when the first longitudinal vibration horn 17a causes a shrinking vibration, the second longitudinal vibration horn 17b causes a stretching vibration. More specifically, the state changes from the state of FIG. 4 to the state of FIG. 5, then, passing through the neutral state of FIG. 4, enters the state of FIG. 6, and then passing through the neutral state of FIG. 4, returns to the state of FIG. 5. Such state changes are repeated.

Further, in the neutral state of FIG. 4, there is a distance L is a distance in plan view between the annular outer shape (for example, a circular circumference or a square-shaped outer periphery, in the present embodiment, the square-shaped outer periphery) of the one-wavelength torsional vibrator portion 13 and the outer periphery line of the longitudinal vibration horn. In other words, the annular outer shape of the one-wavelength torsional vibrator portion 13 does not directly contact the outer periphery of the longitudinal vibration horn. Still another way of saying this is that the first flexural resonator portion 15a is disposed to cause the annular outer shape of the one-wavelength torsional vibrator portion 13 to be separated from the outer periphery of the longitudinal vibration horn in the Z direction (direction orthogonal to the longitudinal vibration direction). Therefore, the one-wavelength torsional vibrator portion 13 rotationally vibrates through bending of the first flexural resonator portion 15a (note that the annular one end 21 of the first flexural resonator portion 15a is not bent). More specifically, in the state of FIG. 5 in which the first longitudinal vibration horn 17a stretches and the second longitudinal vibration horn 17b shrinks, the one-wavelength torsional vibrator portion 13 rotates clockwise; and in the state of FIG. 6 in which the first longitudinal vibration horn 17a shrinks, and the second longitudinal vibration horn 17b stretches, the one-wavelength torsional vibrator portion 13 rotates counterclockwise.

The first flexural resonator portion 15a is configured such that when a longitudinal vibration generated by at least the first longitudinal vibration converter 11a is received from the one end 21 of the first flexural resonator portion 15a, the first flexural resonator portion 15a is bent, and imparts a rotational force from the other end 23 of the first flexural resonator portion 15a to the one-wavelength torsional vibrator portion 13.

By the longitudinal vibration generated by the first longitudinal vibration converter 11a as described above, the one-wavelength torsional vibrator portion 13 performs a torsional vibration. In other words, the longitudinal vibration is converted to the torsional vibration. When ultrasonic welding is performed, an object to be welded is brought into pressurized contact with the working torsional horn 5, and then welding is performed. More specifically, a driving force is inputted to the annular peripheral surface of the one-wavelength torsional vibrator portion 13 and is outputted from an end surface in the axial direction of the one-wavelength torsional vibrator portion 13, thereby to work on a workpiece.

Figure 7:
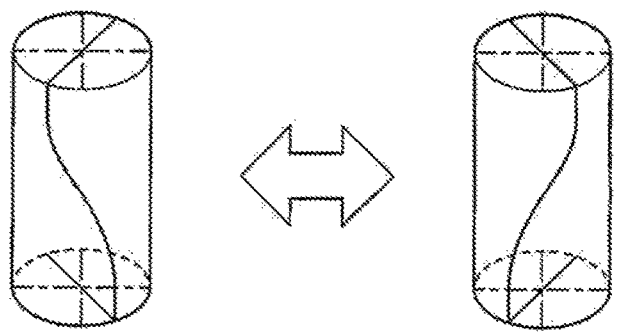
FIG. 7 is a view illustrating a relationship between a half-wavelength torsional horn and a wavelength.
Figure 8:
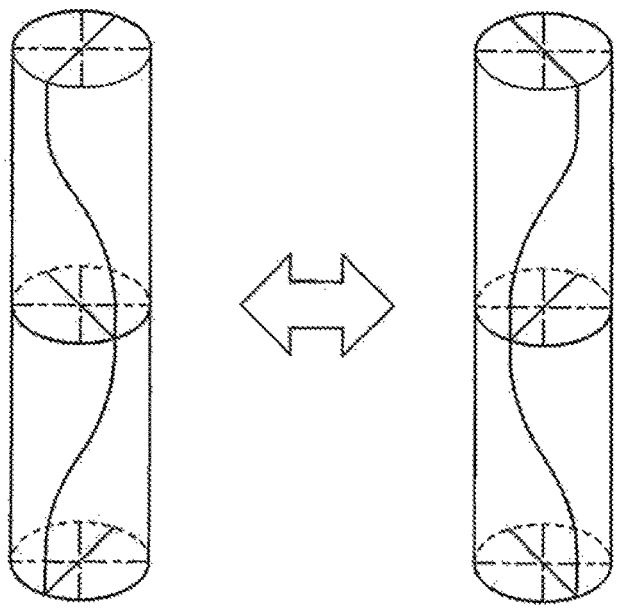
FIG. 8 is a view illustrating a relationship between a one-wavelength torsional horn and a wavelength.

Further, the mechanism of vibration will be described. The present invention greatly reduces the occurrence of stress concentration not by directly converting from a longitudinal vibration to a torsional vibration, but by passing through the flexural resonator portion in the middle. First, as illustrated in a half-wavelength torsional vibration of FIG. 7, a half-wavelength longitudinal vibration horn is coupled to a longitudinal vibration converter; and further as illustrated in a one-wavelength torsional vibration of FIG. 8, a transducer generating a flexural vibration half-wavelength is sandwiched between half-wavelength horns, thereby to impart a stable driving force to a flexural plate. The flexural resonator portion for use as the flexural plate is designed with the same resonant frequency as the longitudinal vibration horn and thus stress concentration does not occur. Further, as illustrated in FIG. 8, the flexural plate is coupled at an intermediate position of the one-wavelength torsional horn having the same resonant frequency, and the flexural vibration of the plate is converted to the torsional vibration.

The longitudinal vibration and the flexural vibration are coupled to each other not by using nuts and the like but by sandwiching the transducer between the half-wavelength horns having high rigidity. The reason for this is to prevent loss from occurring during conversion of the flexural vibration, which might otherwise be caused by deformation of the sandwiched portion in the mode using the nuts.

A resonance equation for a general beam can be applied to the resonance of the flexural vibration plate.

First, assume that $I=(BH^3)/12$, where I is the cross sectional secondary moment, B is the width direction of the cross direction, and H is the thickness direction.

Further, assume that the relation to the frequency f is $$2\pi f=(1.875/L)^2 \times \sqrt{(EI/\rho A)},$$

where E is the Young's modulus of the material, $\rho$ is the density, A is the cross sectional area, and L is the length.

At this time, 1.875 is a first-order constant when one end is fixed, and L is ¼ wavelength. A length of about 2×L is required as a coupling between resonators.

As an example, in the case of 20 kHz and an iron material, the length is about 29 mm to 45 mm with a width of 5 mm to 12 mm; and in the case of one-wavelength, the length is 58 mm to 90 mm with a width of 5 mm to 12 mm.

Note that for obtaining an exact solution, finally, a numerical analysis (finite element method) can be used to obtain the length corresponding to the current shape.

The above described present embodiment can greatly reduce the occurrence of cracks although using a longitudinal vibration converter for obtaining a torsional vibration.

Second Embodiment

Figure 9:
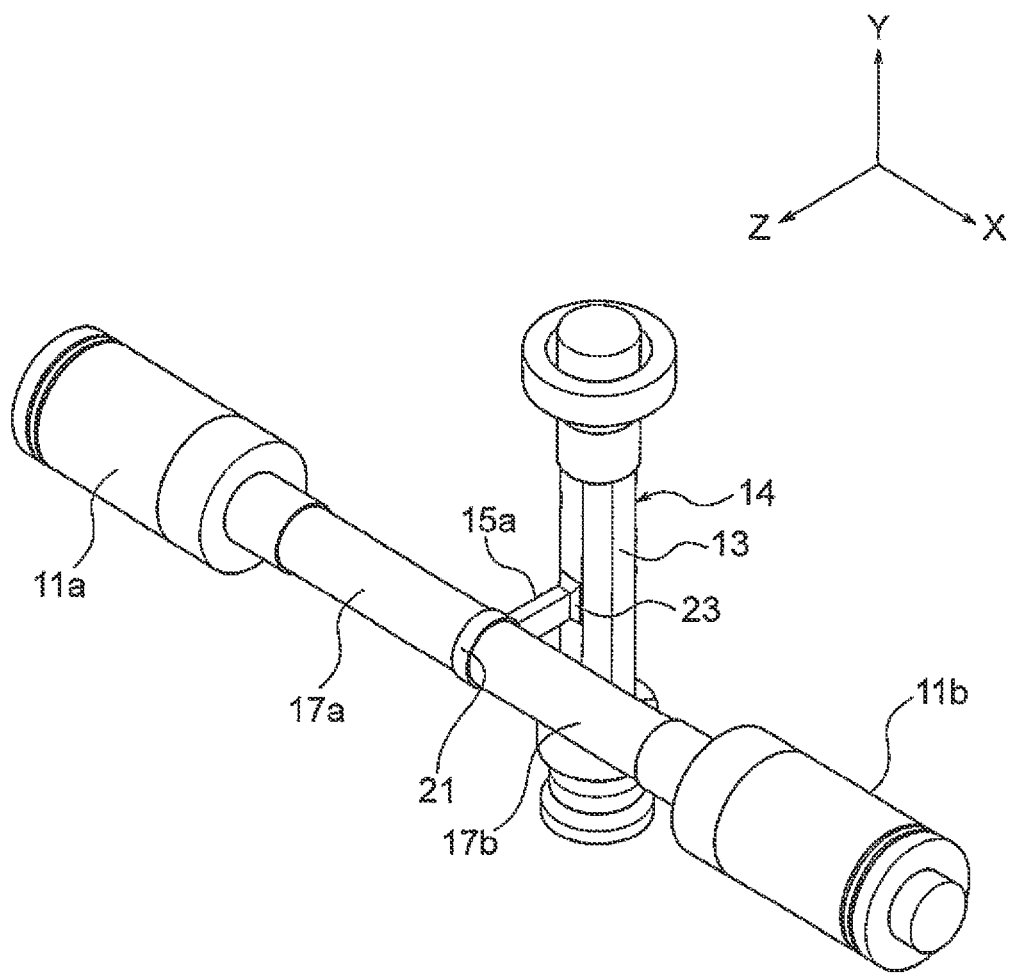
FIG. 9 is a perspective view illustrating an ultrasonic welding device according to a second embodiment of the present invention.

With reference to FIG. 9, a second embodiment of the present invention will be described. The present invention is not limited to the embodiment having only one longitudinal vibration converter, but may include a mode in which one end of the flexural resonator receives a longitudinal vibration generated by another longitudinal vibration converter. The second embodiment is one example of this.

As illustrated in FIG. 9, the vibration conversion apparatus of the second embodiment comprises a second longitudinal vibration converter 11b. The second longitudinal vibration horn 17b is located on a vibration transmission path between the second longitudinal vibration converter 11b and the one end 21 of the first flexural resonator portion 15a.

This mode not only has the advantages of the above described first embodiment but also can achieve high power using a plurality of converters and driving the converters by one oscillator. Note that this mode illustrates an example of incorporating an even number of converters, but another mode incorporating an odd number of converters can also be implemented by controlling the phase on the oscillator side.

Third Embodiment

Figure 10:
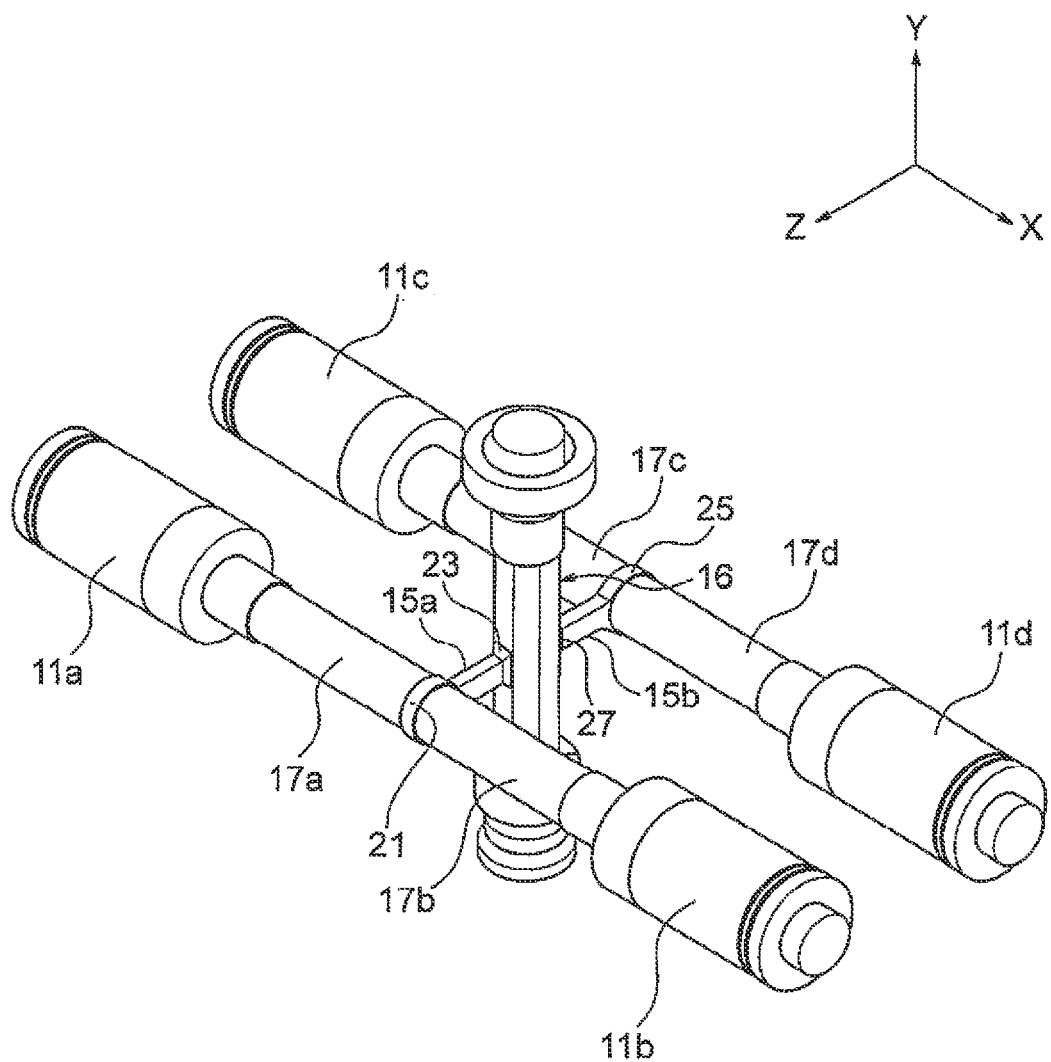
FIG. 10 is a perspective view illustrating an ultrasonic welding device according to a third embodiment of the present invention.

With reference to FIG. 10, a third embodiment of the present invention will be described. The present invention is not limited to the embodiment having only one flexural resonator portion, but may include a mode in which the longitudinal-torsional transducer has a plurality of flexural resonator portions, and the one-wavelength torsional vibrator portion is vibrated by the plurality of flexural resonator portions. The third embodiment is one example of this.

As illustrated in FIG. 10, the vibration conversion apparatus of the third embodiment comprises a longitudinal-torsional transducer 16; a third longitudinal vibration converter 11c and a fourth longitudinal vibration converter 11d; and a third longitudinal vibration horn 17c and a fourth longitudinal vibration horn 17d. The longitudinal-torsional transducer 16 comprises the one-wavelength torsional vibrator portion 13, and the first flexural resonator portion 15a and a second flexural resonator portion 15b. The wavelength torsional vibrator portion 13, the first flexural resonator portion 15a, and the second flexural resonator portion 15b are also configured as a one-piece component in the same manner as the above described first embodiment.

As viewed in the axial direction (Z direction) of the first flexural resonator portion 15a, the second flexural resonator portion 15b is disposed on the opposite side of the first flexural resonator portion 15a with the one-wavelength torsional vibrator portion 13 interposed therebetween. The third longitudinal vibration horn 17c is located on a vibration transmission path between the third longitudinal vibration converter 11c and the one end 25 of the second flexural resonator portion 15b.

The other end 27 of the second flexural resonator portion 15b is connected to the one-wavelength torsional vibrator portion 13. The one end 25 of the second flexural resonator portion 15b is interposed between the third longitudinal vibration horn 17c and the fourth longitudinal vibration horn 17d in the longitudinal vibration direction (X direction). The fourth longitudinal vibration horn 17d is located on a vibration transmission path between the fourth longitudinal vibration converter 11d and the one end 25 of the second flexural resonator portion 15b. Although the present invention is not limited to this configuration, the configuration illustrated in FIG. 10 is front-rear symmetric and left-right symmetric about the one-wavelength torsional vibrator portion 13.

OTHER EMBODIMENTS

Figure 11:
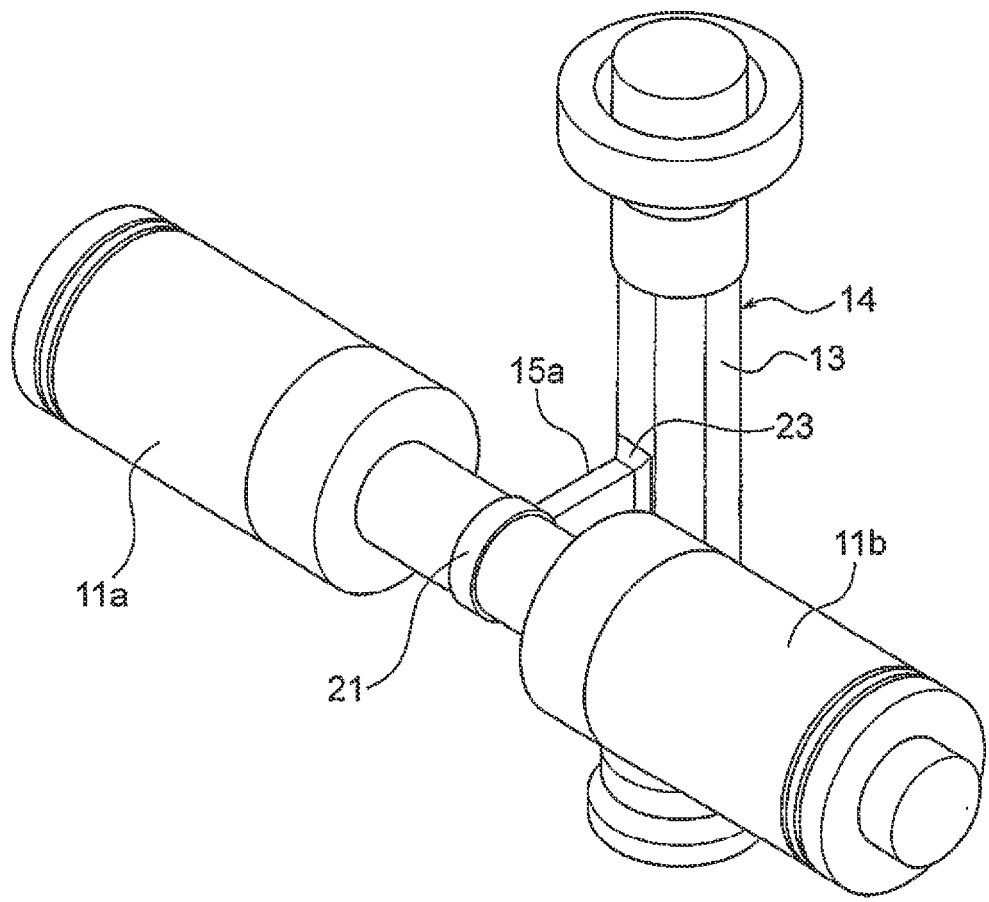
FIG. 11 is a perspective view illustrating an ultrasonic welding device according to a fourth embodiment of the present invention.
Figure 11:
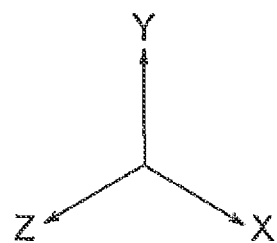
Figure 12:
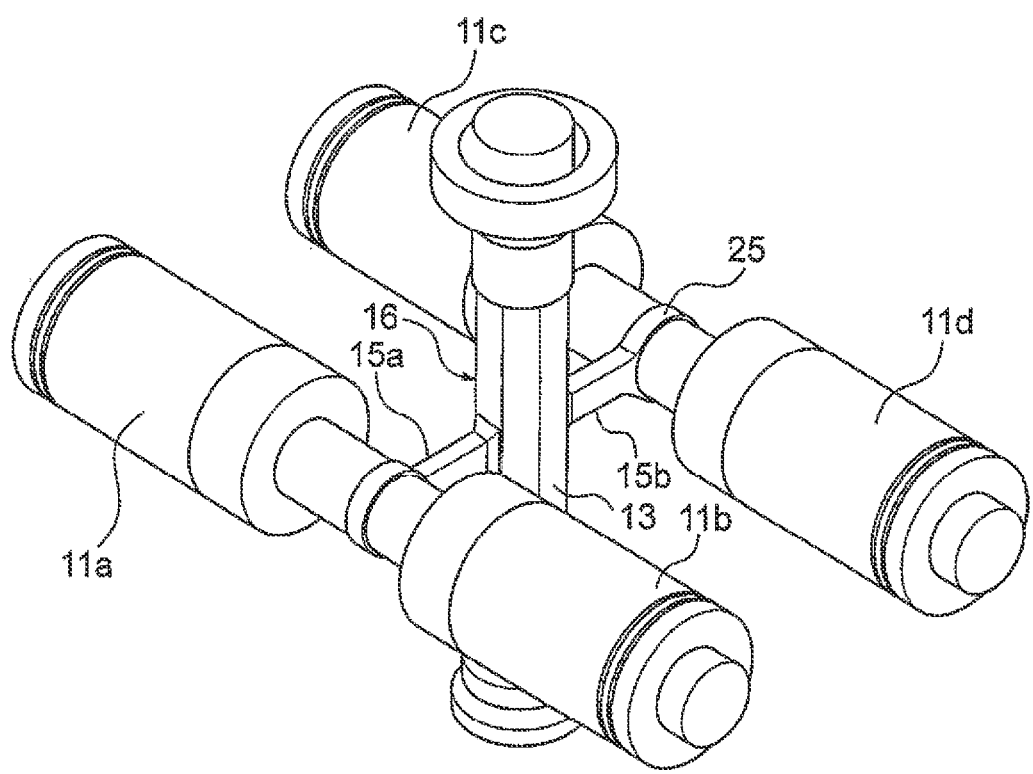
FIG. 12 is a perspective view illustrating an ultrasonic welding device according to a fifth embodiment of the present invention.
Figure 12:
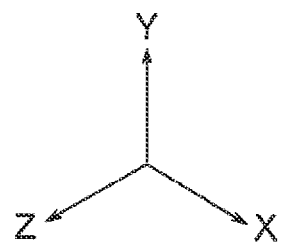

The present invention is not limited to the embodiment requiring a longitudinal vibration horn, but may omit the longitudinal vibration horn (longitudinal vibration booster) and the one end of the flexural resonator portion may be sandwiched directly between the converters as long as the material of a front drive of the converters can sufficiently withstand the high power. A fourth embodiment illustrated in FIG. 11 and a fifth embodiment illustrated in FIG. 12 are the specific examples. The fourth embodiment illustrated in FIG. 11 illustrates a mode omitting the longitudinal vibration horns in the configuration of FIG. 9. The fifth embodiment illustrated in FIG. 12 illustrates a mode omitting the longitudinal vibration horns in the configuration of FIG. 10.

REFERENCE SIGNS LIST 1 ultrasonic welding device
3 vibration conversion apparatus
11a first longitudinal vibration converter
11b second longitudinal vibration converter
11c third longitudinal vibration converter
11d fourth longitudinal vibration converter
13 one-wavelength torsional vibrator portion
14, 16 longitudinal-torsional transducer
15a first flexural resonator portion
15b second flexural resonator portion
17a first longitudinal vibration horn
17b second longitudinal vibration horn
17c third longitudinal vibration horn
17d fourth longitudinal vibration horn

The invention claimed is:

1. A vibration conversion apparatus comprising:
a first longitudinal vibration converter; and
a longitudinal-torsional transducer having a one-wavelength torsional vibrator portion and a first flexural resonator portion, wherein
the first flexural resonator portion is interposed between the first longitudinal vibration converter and the one-wavelength torsional vibrator portion and the first flexural resonator portion having a length of at least 29 mm between the first longitudinal vibration converter and the one-wavelength torsional vibration portion, and
the first flexural resonator portion is configured such that when a longitudinal vibration generated by at least the first longitudinal vibration converter is received from a first end of the first flexural resonator portion, the first flexural resonator portion is bent and imparts a rotational force from a second end of the first flexural resonator portion to the one-wavelength torsional vibrator portion.

2. The vibration conversion apparatus according to claim 1, wherein
a first longitudinal vibration horn is located on a vibration transmission path between the first longitudinal vibration converter and the first end of the first flexural resonator portion, and
the second end of the first flexural resonator portion is connected to the one-wavelength torsional vibrator portion.

3. The vibration conversion apparatus according to claim 2, comprising a second longitudinal vibration horn, wherein
the first end of the first flexural resonator portion is located between the first longitudinal vibration horn and the second longitudinal vibration horn in a longitudinal vibration direction.

4. The vibration conversion apparatus according to claim 3, comprising a second longitudinal vibration converter, wherein
the second longitudinal vibration horn is located on a vibration transmission path between the second longitudinal vibration converter and the first end of the first flexural resonator portion.

5. The vibration conversion apparatus according to claim 4, wherein
the vibration conversion apparatus comprises a third longitudinal vibration converter and a fourth longitudinal vibration converter; and a third longitudinal vibration horn and a fourth longitudinal vibration horn,
the longitudinal-torsional transducer has a second flexural resonator portion,
as viewed in an axial direction of the first flexural resonator portion, the second flexural resonator portion is disposed on an opposite side of the first flexural resonator portion with the one-wavelength torsional vibrator portion interposed therebetween,
the third longitudinal vibration horn is located on a vibration transmission path between the third longitudinal vibration converter and the onea first end of the second flexural resonator portion,
the first end of the second flexural resonator portion is located between the third longitudinal vibration horn and the fourth longitudinal vibration horn in the longitudinal vibration direction,
a second end of the second flexural resonator portion is connected to the one-wavelength torsional vibrator portion, and
the fourth longitudinal vibration horn is located on a vibration transmission path between the fourth longitudinal vibration converter and the first end of the second flexural resonator portion.

6. An ultrasonic welding device comprising the vibration conversion apparatus according to claim 1.

7. An ultrasonic welding device comprising the vibration conversion apparatus according to claim 2.

8. An ultrasonic welding device comprising the vibration conversion apparatus according to claim 3.

9. An ultrasonic welding device comprising the vibration conversion apparatus according to claim 4.

10. An ultrasonic welding device comprising the vibration conversion apparatus according to claim 5.

* * * * *